(12) United States Patent
Ahmet et al.

(10) Patent No.: US 11,263,099 B2
(45) Date of Patent: Mar. 1, 2022

(54) TESTING DEVICE FOR TESTING INTERNET-OF-THINGS DEVICE

(71) Applicant: T-Mobile USA, Inc., Bellevue, WA (US)

(72) Inventors: Jeff Ahmet, Issaquah, WA (US); Alejandro Aguirre-Rivadeneyra, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 102 days.

(21) Appl. No.: 16/287,449

(22) Filed: Feb. 27, 2019

(65) Prior Publication Data

US 2020/0272547 A1    Aug. 27, 2020

(51) Int. Cl.
| | | |
|---|---|---|
| *G06F 11/00* | (2006.01) | |
| *G06F 11/22* | (2006.01) | |
| *H04L 67/12* | (2022.01) | |
| *G06F 11/36* | (2006.01) | |
| *H04L 43/0811* | (2022.01) | |
| *G06F 8/65* | (2018.01) | |
| *H04L 67/141* | (2022.01) | |

(52) U.S. Cl.
CPC .......... *G06F 11/2294* (2013.01); *G06F 8/65* (2013.01); *G06F 11/3664* (2013.01); *H04L 43/0811* (2013.01); *H04L 67/12* (2013.01); *H04L 67/141* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,473,381 | B2* | 10/2016 | Kahkoska | H04L 41/24 |
| 9,717,012 | B2* | 7/2017 | Zakaria | H04W 68/00 |
| 2008/0313344 | A1* | 12/2008 | Joung | H04L 1/24 |
| | | | | 709/230 |
| 2013/0261465 | A1* | 10/2013 | Nakamura | A61B 8/462 |
| | | | | 600/459 |
| 2015/0095717 | A1* | 4/2015 | Frenz | G06F 11/2294 |
| | | | | 714/46 |
| 2016/0283361 | A1* | 9/2016 | Alexander | G06F 11/3648 |
| 2017/0242557 | A1* | 8/2017 | Rotschield | H04L 41/22 |
| 2017/0371937 | A1* | 12/2017 | Shah | G06F 8/71 |
| 2019/0274086 | A1* | 9/2019 | Cui | H04W 4/70 |
| 2020/0059976 | A1* | 2/2020 | Bhatia | H04W 8/005 |
| 2020/0092192 | A1* | 3/2020 | Ekambaram | H04L 67/12 |

* cited by examiner

*Primary Examiner* — Amine Riad
(74) *Attorney, Agent, or Firm* — Lee & Hayes, P.C.

(57) ABSTRACT

Technologies for providing a testing environment to an Internet-of-Things (IoT) device, including a narrow band IoT device, are discussed herein. A testing device is connected to the IoT device and establishes a test data link with a testing environment, allowing for a test communication pathway that operates in parallel to the main communication link used by the IoT device. The testing device may use various communication protocols to perform testing on the IoT device. The testing device may also provide Internet capabilities by providing an Internet Protocol address to the data provided by the IoT device, allowing the IoT device to act as an Internet-enabled IoT device during testing.

17 Claims, 3 Drawing Sheets

TESTING DEVICE FOR TESTING INTERNET-OF-THINGS DEVICE

BACKGROUND

In today's connected world, there is a proliferation of devices that receive and transmit data to, among other things, inform their users of various conditions and optimize the operation of the device. For example, devices such as refrigerators, coffee makers, and pressure cookers may have the capability to be part of a network of devices such as the Internet-of-Things (IoT). The IoT involves providing communication (or Internet) connectivity beyond standard devices such as desktops and cell phones, to items that traditionally have been not been connect to a network. Embedded with technology, these devices may communicate and interact over the Internet, and they may be remotely monitored and controlled.

However, testing and communicating with these devices may be difficult because the primary function of a lot of IoT devices is not dependent on the ability to communicate. For example, a "connected" refrigerator will likely work just fine if it is not connected to a network. While the user may not be able to order food from the refrigerator if the device is not connected to the network, the refrigerator will likely still function at an acceptable level. As a result, the designs of these devices often lead to IoT componentry that is difficult to interface with for testing purposes, for example.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
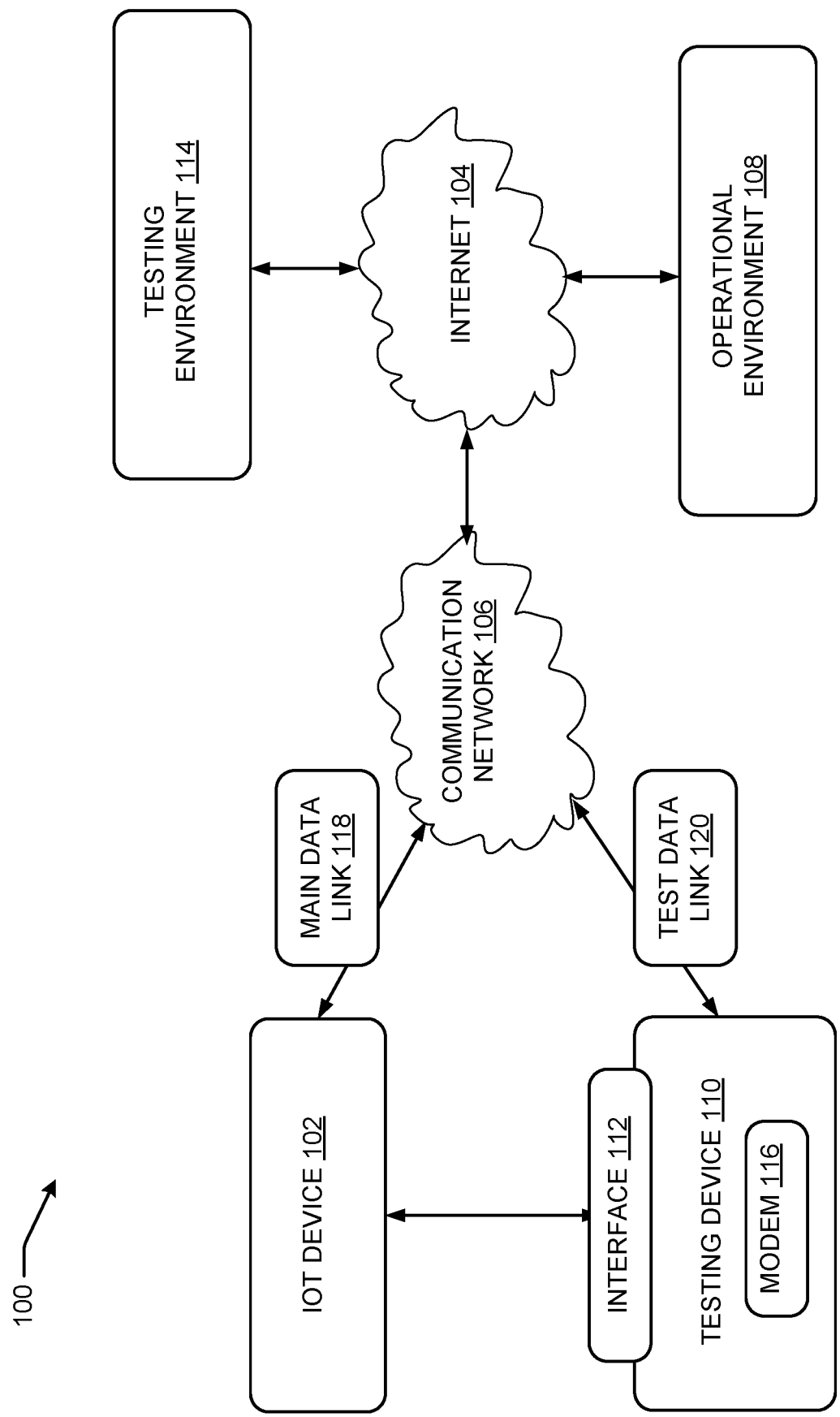
FIG. 1 illustrates an example environment for providing an Internet-of-Things testing environment.

Described herein are technologies for providing an Internet-of-Things testing environment. In conventional technologies, interfacing with various types of IoT devices may be problematic, especially with devices that are integrated units that have no display capabilities. For example, an IoT device such as a coffee maker may have limited capabilities whereby the device has no display, keyboard, or touchscreen that allows for an easy to use testing interface.

Further, in many conventional IoT devices, the data input/output capabilities are bandwidth limited. For example, some devices are Narrowband IoT (NB-IoT) devices. NB-IoT devices use a low power, wide area radio technology standard that typically focuses on indoor coverage, low cost, long battery life, and high connection density. NB-IoT uses a subset of the Long-Term Evolution (LTE) standard but limits the bandwidth to a single narrow-band of 200 kHz. Some uses of NB-IoT devices include smart metering (electricity, gas and water), facility management services, intruder and fire alarms for homes and commercial properties, connected personal appliances measuring health parameters, and "smart" city infrastructure such as street lamps.

Because IoT devices interface with cellular networks, and the integrity of the data transmitted to and from the devices may be monetarily and operationally important, it may be important to test different use cases of the IoT devices, including NB-IoT devices. However, because IoT devices often lack interface components such as a keyboard, display, or touchscreen, it may be difficult to test different protocols and use cases to determine how the devices are acting on a mobile carrier network.

In some examples of the presently disclosed subject matter, a testing environment is provided to test IoT devices, especially those having limited or non-existent user interface capabilities. The testing environment includes an interface module that communicates with a mobile carrier network. The interface module is designed to provide a testing communication pathway between the IoT device and a test server implemented by the mobile communication network or another entity in communication with the mobile communication network. In some examples, the interface module has one or more interfaces to allow a user or computing device to interface with the IoT device using the interface module. Examples of interfaces include, but are not limited to, a keyboard, touchscreen, display, mouse, and cursor control.

In some examples, the testing device provides a testing communication pathway to a testing environment (e.g., a test data link). The testing communication pathway may operate in parallel to, or in place of, the normal communication pathway of the IoT (e.g., a main data link), allowing the IoT device to continue operating while the data communicated between the IoT device and a server is monitored. In some examples, the IoT devices may be devices addressable over the Internet (IP IoT devices) or devices that are not addressable over the Internet (non-IP IoT devices). For non-IP IoT devices, the testing device may provide an IP address so that the IoT device may operate as a IP IoT device, allowing for testing over the Internet. In some examples, the testing device may be provided with an IP address that may be used when testing the non-IP IoT device.

Various examples of the presently disclosed subject matter may reduce human error, increase productivity, and/or reduce bandwidth usage. As noted above, a significant portion of IoT devices are devices that are installed within another machine (such as a water meter, refrigerator, or coffee maker). It may be important to test the IoT device by receiving data from the IoT device, and in some instances, inputting data into the IoT device. However, as noted above, it is often difficult to establish a testing environment that facilitates testing. In some conventional systems, in order to establish a testing environment, a testing device will need to access the account to which the IoT device is connected. In some examples, the testing device may input data. However, because the testing device is accessing the IoT device through the account associated with the device, if there is a problem, the test results may have little to no determinative value. This may waste time and money, and in some instances, result in erroneous conclusions. Various examples of the presently disclosed subject matter may reduce those issues by establishing a testing environment and providing an interface that allows for the connection of a testing device to the IoT device itself rather than through an account associated with the IoT device.

FIG. 1 illustrates an example operation environment 100 to provide testing for IoT devices. In FIG. 1, an IoT device 102 is an IoT device that may be used to perform various communication and operational functions within a networked system. The IoT device 102 may be various devices such as, but not limited to, devices used for appliances such as refrigerators or ovens, water meters, power meters, coffee machines, thermostats, light bulbs, product tracking in warehouses, health trackers, and the like. The presently disclosed subject matter is not limited to any particular type of IoT device.

The IoT device 102 may connect to the Internet 104 using a communication network 106. In some examples, the communication network 106 may be one or more types of communication networks, such as, but not limited to, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). In some examples, the communications networks described herein may include any network topologies including, but not limited to, 2G, 3G, 4G, 4G LTE, 5G, Wi-Fi, Bluetooth, Bluetooth Low Energy, and the like. In other examples, the communication network may be wired or wireless Internet Protocol-based networks capable of establishing communication with a communication services server.

During normal operations, the IoT device 102 is connected to an operational environment 108 through the communication network 106 and the Internet 104. In some examples, the operational environment 108 is a specialized server designed to coordinate activities and communications related to the IoT device 102. For example, the IoT device 102 may be a water meter. The operational environment 108 may be a server setup and run by a water company that receives data relating to the IoT device 102, such as water usage and dates of water usage. In another example, the IoT device may be a thermostat and the operational environment 108 may be an Internet service whereby a user may log into the operational environment 108 to control the IoT device 102.

To provide testing for the IoT device 102, a testing device 110 is provided. In some examples, the testing device 110 has one or more input/output interfaces that may receive data from the IoT device 102, input data to the IoT device 102, display data from the IoT device 102, and/or receive input from a user as an input for the IoT device 102, among other capabilities. The testing device 110 may connect to the Internet 104 using the communication network 106. The testing device 110 may connect to the Internet 104 using various communication protocols, including but not limited to the communication protocols described above with respect to the IoT device 102.

To test the IoT device 102, the testing device 110 includes an interface 112. The interface 112 may vary in type and number depending on the particular configuration of the testing device 110. For example, the interface 112 may include, but is not limited to, a keyboard, a data input such as a Universal Serial Bus (USB) input, a display, a touch screen input, and the like. The testing device may be configured to test using various testing protocols including, but not limited to, constrained application protocols, and machine-to-machine/IoT (MQTT). The testing device 110 may also be configured to allow for the remote management of the IoT device 102 in certain configurations.

Once the testing device 110 is connected to the IoT device 102 via the interface 112, the testing device 110 may connect to a testing environment 114 through the Internet 104. It should be noted, however, that the testing device 110 may be connected to the testing environment 114 prior to or during the connection to the IoT device 102. The testing environment 114 is a server-implemented testing environment that allows the receipt of data from the IoT device 102 through the testing device 110, as well as the transmission of test data to the IoT device 102 through the testing device 110. The testing environment 114 may also be configured to perform other functions as required or desired. For example, the testing environment 114 may be used to analyze data received from the IoT device 102 or verify data received from the IoT device. Additionally, although illustrated separately from the operational environment 108, the testing environment 114 may be a part of the operational environment 108 or provided by the same entity.

To connect the testing device 110 to the testing environment, various technologies may be used. For example, point-to-point (PPP) may be used using a modem 116 on the testing device 110. The use of PPP allows the modem 116 to connect to an internet gateway used by Internet service providers (ISPs) to enable dial up connections, or other connections as available or desired, to the Internet. PPP facilitates the transmission of data packets between point to point links. Another technology may be WvDial, a utility that also uses the modem 116 to connect to the Internet 104 and may be used in various Linux environments. Other technologies used to facilitate communication may be used and include, but are not limited to, GSM, GPRS, cdmaOne, CDMA2000, EV-DO, EDGE, UMTS, Wi-Fi, Bluetooth, and Bluetooth Low Energy.

In some examples, the testing device 110 may be connected to the IoT device 102 to receive/transmit data while allowing the IoT device 102 to function normally. As illustrated in FIG. 1, the IoT device 102 may connect to the operational environment 108 through the communication network 106 using a main data link 118. This is the default data link used by the IoT device 102 during normal operations. When connected, at the same time the IoT device is connected to and communicating with the operational environment 108, the testing device 110 may connect to the testing environment 114 using a test data link 120. Thus, a testing communication pathway may be established to allow for parallel communications, one to the testing environment 114 and one to the operational environment 108. Thus, the IoT device 102 may be tested in situ rather than being placed in a testing mode or other mode that may alter the operation of the IoT device 102. The use of in situ testing also allows the IoT device 102 to continue its operation while being tested. This may be especially useful in situations in which there is a need or desire for the IoT device 102 to continue operation, such as a water meter, power meter, or other type of IoT device 102.

In some examples, the IoT device 102 may not be addressable over the Internet 104 with an Internet Protocol (IP) address. In some examples, the IoT device 102 may be a device that is only addressable using a hub or other communication device. In order to communicate through the Internet 104 and find (address) the IoT device 102 without the need to go through a hub or other communication pathway, the testing device 110 may be configured to allow for these non-IP IoT devices. The testing device 110 may be configured to have an IP address that is used as a proxy IP address for the non-IP IoT device 102. Thus, testing services in the testing environment that may require an IP address may be used by using the IP address of the testing device 110.

Further, because the non-IP IoT device 102 may not be capable of receiving a data string that includes the IP address, the testing device 110 may remove the additional IP address data prior to transmission to the non-IP IoT device 102. For example, some water meters are configured to operate in a narrow band IoT environment. Narrowband IoT (NB-IoT) is a Low Power Wide Area Network radio technology standard developed by 3GPP to enable a wide range of cellular devices and services. In some examples, the water meter may only be capable of reading 10 bytes of data due to its use as a NB IoT device, but the use of header information (such as an IP address) may add 60 or more bytes of data. Once the data is received at the testing device 110 from the testing environment 114, the additional data not used by the IoT device 102 may be removed, with the remaining data being transmitted to the IoT device 102.

Figure 2:
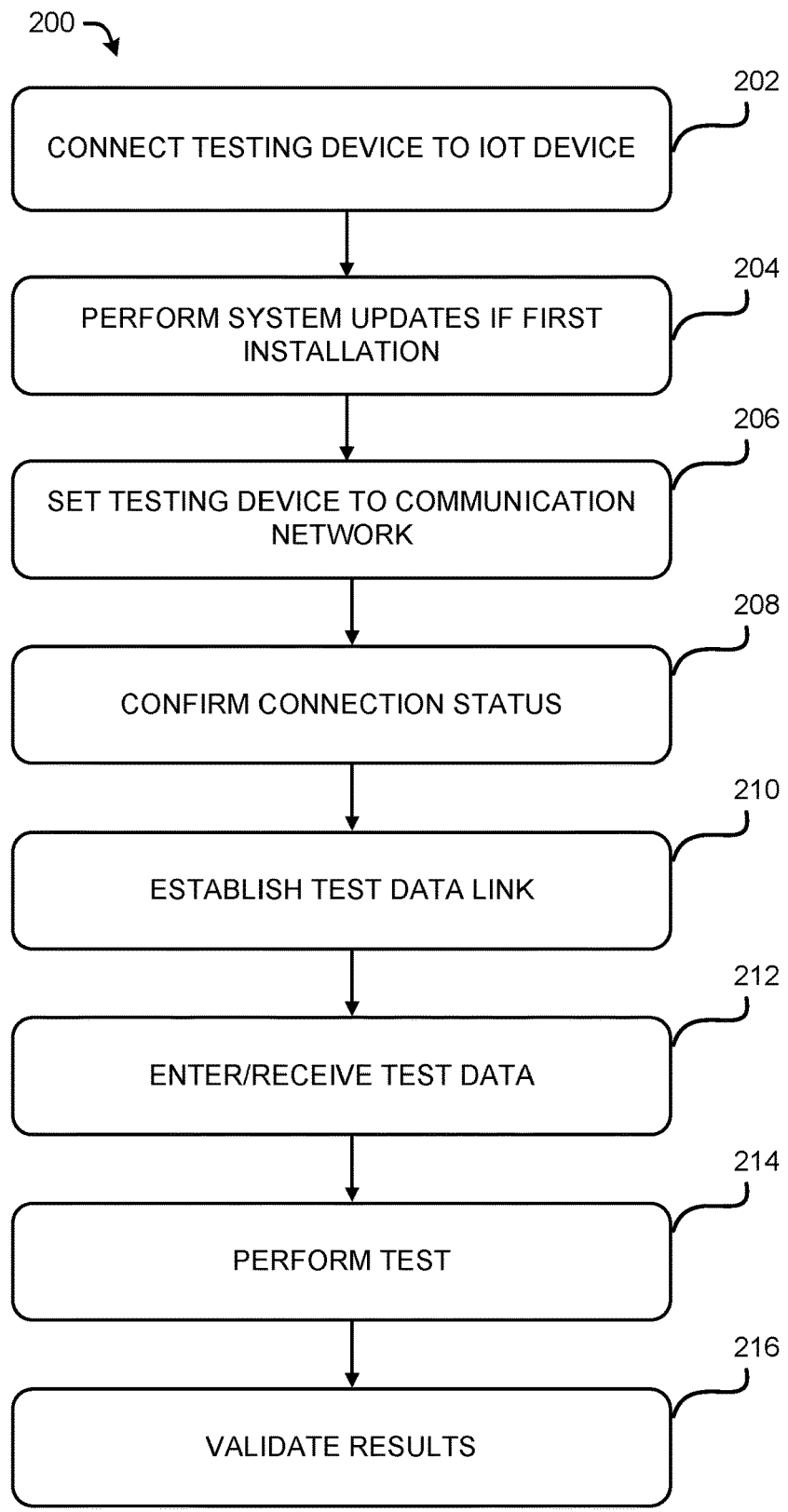
FIG. 2 is an illustrative process for providing an Internet-of-Things testing environment.

FIG. 2 is an illustrative process 200 for providing a testing device. The process is illustrated as example flow graphs, each operation of which may represent a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Referring to FIG. 2, the process 200 commences at operation 202, where the testing device 110 is connected to the IoT device 102. In some examples, the testing device 110 is a Raspberry Pi TM unit that provides for operational capabilities, although other types of units may be used and are considered to be within the scope of the presently disclosed subject matter.

The process 200 continues to operation 204, where a system update is commenced if the installation of the testing device 110 is a new installation or an update is necessary. In some examples, a system update is not necessary, and the operation 204 may not be commenced, whereby the process moves from operation 202 to operation 206. In some examples, the operation 204 may be performed after determining a system configuration of the IoT device 102. For example, the system software of the IoT device 102 may have a version number not previously known. This may happen in various instances. For example, some IoT devices 102, such as water meters used by water companies, do not regularly update or receive instructions from a server that include system updates due to system and bandwidth limitations. Over a period of time, some IoT devices 102 may receive one or more updates while others, if not interacted with, may receive fewer or no updates. Thus, in these instances, a user or other testing entity may not know the actual software version until a communication link is established with the IoT device 102. Thus, the software of the testing device 110 may need to be updated or changed in order to communicate and test properly.

The process 200 continues to operation 206, where the testing device 110 is set to the communication network 106 to be used. In some examples, more than one type of communication network 106 may be available for use. The communication network 106 may be a cellular network or a Wifi network, or other networks. The presently disclosed subject matter is not limited to a particular type of communication network.

The process 200 continues to operation 208, where a connection status of the testing device 110 to the testing environment 114 is confirmed. In some examples, the testing environment 114 is provided by the system that provides the operational environment 108. In other instances, the testing environment 114 is provided by a separate service. The presently disclosed subject matter is not limited to any particular configuration of the testing environment 114. Further, the confirmation may be achieved in various ways, such as a transmission and receipt of an acknowledgement communication from the testing environment 114.

The process 200 continues to operation 210, where the test data link 120 is established. As noted above, in some examples, the testing device 110 may provide a testing environment 114 that operates in parallel to the operational environment 108. Thus, in some examples, while the main data link 118 is maintained, the test data link 120 may be established and used. The establishment of a parallel test data link 120 may allow the IoT device 102 to continue to communicate with the operational environment 108 while testing of the IoT device 102 may be performed. For devices such as water meters, power meters, and other devices such as devices in which maintaining the device in an operational status is important, the parallel test data link 120 may accomplish a high degree of operational status while allowing for testing and maintenance.

Further, depending on the capabilities of the IoT device 102, the testing device 110 may be used as a direct input to update programming on the IoT device 102. The IoT device 102 may have limited communication capabilities that makes program updates difficult or time consuming. For example, the communication capabilities of a narrow band IoT device may be limited. To update the programming on the NB-IoT device may take significant time and consume the limited bandwidth available to the NB-IoT device. Thus, to update the programming on the NB-IoT device, the testing device 110 may receive data and directly input the programming to the IoT device 102 through a serial connection rather than a limited wireless connection.

The process 200 continues to operation 212, where test data is entered and received. Various configurations of the testing device 110 include the interface 112. The interface 112 may vary in type any number depending on the particular configuration of the testing device 110. For example, the interface 112 may include, but is not limited to, a keyboard, a data input such as USB input, a display, a touch screen input, and the like.

In some examples, the input device connected to the interface 112 may provide a user with the means to view data associated with the IoT device 102. As noted above, IoT devices 102, such as NB-IoT devices, have limited or no capabilities that allow for direct interaction with the IoT device 102. The testing device 110 may have one or more interfaces 112 that may display data and/or receive input from the user.

The process 200 continues to operation 214, where a test is performed. In some examples, the test protocol, the program instructions used to test the IoT device 102, is transmitted from the testing environment 114 to the testing device 110 through the test data link 120 and transmitted to the IoT device 102. In other examples, a test protocol is stored on the testing device 110 for transmission to the IoT device 102. In still further examples, a test protocol is received from other sources such as, by way of example, the operational environment 108. The present disclosure is not limited to any particular origin of a test protocol.

Depending on the test protocol, results or output from the IoT device 102 may be provided to various entities. For example, while not perhaps the source of the testing protocol, data or information relating to the test may be received at the operational environment 108. The testing device 110 may transmit data through the test data link 120 to the testing environment 114 or directly to the operational environment 108. In another example, the testing protocol may cause the IoT device 102 to output data or information through the main data link 118 to be received at the operational environment 108.

The process 200 continues to operation 216, where the results are validated. In some examples, the data received at the testing environment 114 and/or the operational environment 108 may be tested and validated. As used herein, validation may mean that the data received is within pre-established parameters or are the data that were expected. The process 200 may thereafter end.

Figure 3:
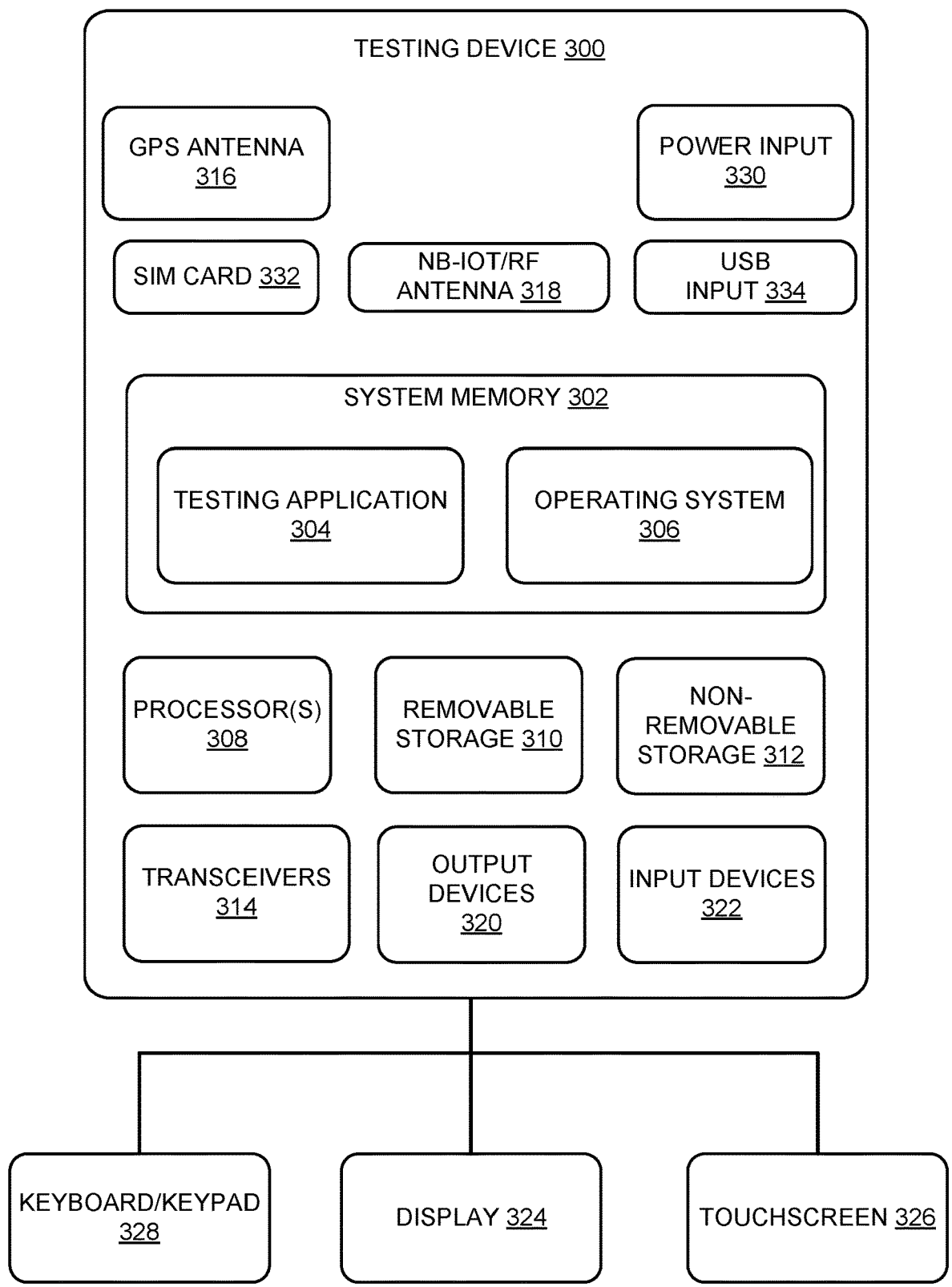
FIG. 3 illustrates a component level view of a testing device configured for use within a wireless communication network in order to provide various services within a wireless communication network.

FIG. 3 is a system diagram of an example testing device 300 that may be used in conjunction with various implementations of the presently disclosed subject matter. As illustrated, the testing device 300 comprises a system memory 302 storing computer-executable instructions to implement a testing application 304. In some examples, the testing application 304 may be a software application used by the testing device 300 to initiate and/or receive data between the testing device 300 and the IoT device 102, the operational environment 108, and/or the testing environment 114. The system memory 302 also stores computer-executable instructions to implement an operating system 306. The operating system 306 is executed by processor(s) 308 and controls operational aspects of the testing device 300.

The testing device 300 includes the processor(s) 308, a removable storage 310, a non-removable storage 312, transceivers 314, output device(s) 320, and input device(s) 322. In various implementations, the system memory 302 is volatile (such as RAM), non-volatile (such as ROM, flash memory, and the like) or some combination of the two. In some implementations, the processor(s) 308 is a central processing unit (CPU), a graphics processing unit (GPU), or both CPU and GPU, or any other sort of processing unit.

The testing device 300 may also include additional data storage devices (removable and/or non-removable) such as, for example, magnetic disks, optical disks, or tape. Such additional storage is illustrated in FIG. 3 by removable storage 310 and non-removable storage 312. Non-transitory computer-readable media may include volatile and nonvolatile, removable and non-removable tangible, physical media implemented in technology for storage of information, such as computer readable instructions, data structures, program modules, or other data. System memory 302, removable storage 310 and non-removable storage 312 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which may be used to store the desired information and which may be accessed by the testing device 300. Any such non-transitory computer-readable media may be part of the testing device 300.

In some implementations, the transceivers 314 include any sort of transceivers known in the art. For example, the transceivers 314 may include wired communication components, such as an Ethernet port, for communicating with other networked devices. Also, or instead, the transceivers 314 may include wireless modem(s) to facilitate wireless connectivity with other computing devices. Further, the transceivers 314 may include a radio transceiver that performs the function of transmitting and receiving radio frequency communications via an antenna, such as a global positioning system (GPS) antenna 316 and/or an NB-IoT/RF antenna 318. The GPS antenna 316 may be configured to receive GPS signals to provide location information to the processors 308. The NB-IoT/RF antenna 318 may be configured to receive and transmit, using the transceivers 314, narrow-band IoT signals as well as other signals, such as cellular communications.

In some implementations, the output devices 320 include any sort of output devices known in the art, such as a display 324 (e.g., a liquid crystal display), a touchscreen 326, speakers, a vibrating mechanism, or a tactile feedback mechanism. Output devices 320 also include ports for one or more peripheral devices, such as headphones, peripheral speakers, or a peripheral display.

In various implementations, input devices 322 include any sort of input devices known in the art. For example, input devices 322 may include a camera, a microphone, a keyboard/keypad 328, or the touchscreen 326. The keyboard/keypad 328 may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The testing device 300 further includes a power input 330 to receive power input from an external power source and/or an internal power source. The testing device 300 additionally includes a subscriber identity module (SIM) card 332. The SIM card 332 may be used to communicate with a mobile network. It should be noted that the presently disclosed subject matter is not limited to mobile networks that require the SIM card 332, as communication made with other types of mobile networks, or other wireless networks, may be used and are considered to be within the scope of the presently disclosed subject matter. The testing device 300 further includes a USB input 334, configured to receive and output communications using an applicable USB standard such as 2.0 or 3.0.

The system memory 302 also has stored therein a testing application 304. The testing application 304 has instructions to perform tests on an IoT device, such as the IoT device 102 of FIG. 1. In some examples, the testing application 304 uses common programming languages native to IoT devices, such as RASPBERRY PI, although other languages may be used and are considered to be within the scope of the presently disclosed subject matter. The testing application 304 may be executed to implement the process 200 of FIG. 2, as well as other functionality. For example, the testing application 304 may be configured to receive inputs from one or more of the input devices 322.

In some examples, the input is a short messaging service (SMS) message from the testing device 300 to the testing environment 114. The SMS may be used to communicate specific information or transmit queries that request functionality perhaps not related to the testing being performed or the functionality of the IoT device 102. For example, the SMS message, "note to file: testing performed in rainy conditions," may be entered by an operator using the keyboard/keypad 328 to be stored by the testing environment 114 during the test as a note that may help identify reasons for potential data abnormalities. The SMS message functionality may be used for other reasons, as well as other inputs.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    establishing a direct connection between a testing device and an Internet-of-Things (IoT) device, whereby the IoT device is configured to communicate with an operational environment using a main data link and wherein the IoT device is not addressable over the Internet;
    confirming a connection status of the direct connection between the testing device and the IoT device;
    setting the testing device to connect to a communication network to establish a test data link to a testing environment while maintaining the main data link, wherein the setting includes adding, by the testing device, Internet Protocol (IP) address data to testing data received from the IoT device so that the IoT device operates as an IP IoT device through the test data link, and wherein the adding is performed prior to transmission of the testing data over the test data link;
    establishing the test data link between the testing device and the testing environment;
    commencing a testing application to test the IoT device;
    receiving, at the testing device, data from the testing environment;
    removing, at the testing device, the IP address data from the data prior to transmission of the data over the direct connection; and
    validating a result of the testing application,
    wherein the testing device and the IoT device are separate and distinct devices.

2. The method of claim 1, wherein the testing device comprises a keyboard, keypad, a display, or a touchscreen display as an input or output component.

3. The method of claim 1, wherein the operational environment and the testing environment are provided by a same entity.

4. The method of claim 1, wherein the test data link is established using a point-to-point protocol between the testing device and the testing environment.

5. The method of claim 1, further comprising transmitting operational data via the main data link while transmitting testing data via the connection and the test data link, during testing, to provide for in situ testing of the IoT device.

6. The method of claim 1, further comprising:
    determining a software version of the IoT device after connecting the testing device to the IoT device;
    determining that a system version of the testing device is not associated with the software version of the IoT device; and
    performing a system update of the testing device after determining the software version of the IoT device.

7. The method of claim 1, wherein the testing device includes a touch input component to enable a user to interact with the IoT device through the direct connection.

8. A non-transitory computer-readable storage medium having computer-executable instructions stored thereupon that, when executed by a testing device, cause the testing device to:
    establish a direct connection with an Internet-of-Things (IoT) device, whereby the IoT device is configured to communicate with an operational environment using a main data link and wherein the IoT device is not addressable over the Internet;
    set the testing device to connect to a communication network to establish a test data link to a testing environment while maintaining the main data link, wherein the computer-executable instructions that, when executed by the computer, cause the testing device to set the testing device to connect to the communication network further comprises computer-executable instructions that, when executed by the testing device, cause the testing device to add Internet Protocol (IP) address data to testing data received from the IoT device prior to transmission of the testing data over the test data link so that the IoT device can operate as an IP IoT device through the test data link;
    confirm a connection status between the testing device and the IoT device;
    establish the test data link between the testing device and the testing environment;
    commence a testing application to test the IoT device;
    receive data from the testing environment;
    remove the IP address data from the data prior to transmission of the data to the IoT device; and
    validate a result of the testing application,
    wherein the testing device and the IoT device are separate and distinct devices.

9. The non-transitory computer-readable storage medium of claim 8, wherein the testing device comprises a keyboard, keypad, a display, or a touchscreen display as an input or output component.

10. The non-transitory computer-readable storage medium of claim 8, wherein the operational environment and the testing environment are provided by a same entity.

11. The non-transitory computer-readable storage medium of claim 8, wherein the test data link is established using a point-to-point protocol between the testing device and the testing environment.

12. The non-transitory computer-readable storage medium of claim 8, further comprising computer-executable instructions that, when executed by the testing device, cause the testing device to:
    maintain the main data link during testing to provide for in situ testing of the IoT device.

13. The non-transitory computer-readable storage medium of claim 8, further comprising computer-executable instructions that, when executed by the testing device, cause the testing device to:
    determine a software version of the IoT device after connecting the testing device to the IoT device; and
    perform a system update of the testing device after determining the software version of the IoT device.

14. The non-transitory computer-readable storage medium of claim 8, wherein the testing device includes a touch input component to enable a user to interact with the IoT device through the direct connection.

15. A testing device comprising:
    a non-transitory storage medium; and
    computer-executable instructions stored in the non-transitory storage medium, the computer-executable instructions being executable by the testing device to:

directly connect to an Internet-of-Things (IoT) device, whereby the IoT device is configured to communicate with an operational environment using a main data link and wherein the IoT device is not addressable over the Internet;

set the testing device to connect to a communication network to establish a test data link to a testing environment while maintaining the main data link, wherein the computer-executable instructions that cause the testing device to set the testing device to connect to the communication network further comprises computer-executable instructions to add Internet Protocol (IP) address data to testing data received from the IoT device prior to transmission of the testing data over the test data link so that the IoT device can operate as an IP IoT device through the test data link;

confirm a connection status between the testing device and the IoT device;

establish the test data link between the testing device and the testing environment;

commence a testing application to test the IoT device;

receive data from the testing environment;

remove the IP address data from the data prior to transmission of the data; and validate a result of the testing application, wherein the testing device and the IoT device are separate and distinct devices.

16. The testing device of claim 15, wherein the test data link is established using a point-to-point protocol between the testing device and the testing environment.

17. The testing device of claim 15, wherein the testing device comprises a touch input component to enable a user to interact with the IoT device through the direct connection.

\* \* \* \* \*